United States Patent
Hillier et al.

(10) Patent No.: US 7,918,919 B2
(45) Date of Patent: Apr. 5, 2011

(54) PROCESS FOR MERCURY CONTROL DURING PRESSURE OXIDATION

(75) Inventors: Daniel Hillier, Oakville (CA); Noelene Ahern, Burnaby (CA); Yeonuk Choi, Oakville (CA)

(73) Assignee: Barrick Gold Corporation, Toronto (CA)

( * ) Notice: Subject to any disclaimer, the term of this patent is extended or adjusted under 35 U.S.C. 154(b) by 131 days.

(21) Appl. No.: 12/208,961

(22) Filed: Sep. 11, 2008

(65) Prior Publication Data

US 2009/0074608 A1  Mar. 19, 2009

Related U.S. Application Data

(60) Provisional application No. 60/973,365, filed on Sep. 18, 2007.

(51) Int. Cl.
  *C22B 3/04* (2006.01)
(52) U.S. Cl. ............................................. 75/744; 423/38
(58) Field of Classification Search ................... 75/744; 423/38
  See application file for complete search history.

(56) References Cited

U.S. PATENT DOCUMENTS

| | | | |
|---|---|---|---|
| 4,289,532 A * | 9/1981 | Matson et al. | 423/29 |
| 4,552,589 A | 11/1985 | Mason et al. | |
| 4,606,763 A | 8/1986 | Weir | |
| 4,610,724 A | 9/1986 | Weir et al. | |
| 4,734,270 A * | 3/1988 | Touro et al. | 423/29 |
| 4,738,718 A * | 4/1988 | Bakshani et al. | 423/29 |
| 4,923,510 A | 5/1990 | Ramadorai et al. | |
| 5,096,486 A | 3/1992 | Anderson et al. | |
| 5,328,669 A | 7/1994 | Han et al. | |
| 5,458,866 A | 10/1995 | Simmons | |
| 5,542,957 A | 8/1996 | Han et al. | |
| 5,653,945 A | 8/1997 | Gathje et al. | |
| 5,851,499 A | 12/1998 | Gathje et al. | |
| 6,315,812 B1 | 11/2001 | Fleming et al. | |
| 6,537,440 B1 | 3/2003 | Richmond et al. | |
| 6,641,642 B2 * | 11/2003 | Simmons et al. | 75/743 |
| 6,755,891 B2 | 6/2004 | Jones | |
| 7,037,482 B2 | 5/2006 | Mason et al. | |
| 7,537,741 B2 | 5/2009 | Lalancette | |
| 2002/0152845 A1 | 10/2002 | Fleming et al. | |
| 2008/0112864 A1 * | 5/2008 | Lalancette | 423/40 |

FOREIGN PATENT DOCUMENTS

| | | |
|---|---|---|
| WO | WO 89/12699 | 12/1989 |
| WO | WO 98/11019 | 3/1998 |
| WO | WO 9811019 A1 * | 3/1998 |

OTHER PUBLICATIONS

Official Action for U.S. Appl. No. 10/932,008, mailed Dec. 17, 2009.
International Search Report for International (PCT) Application No. PCT/IB2008/003586, mailed Aug. 26, 2009.
Written Opinion for International (PCT) Application No. PCT/IB2008/003586, mailed Aug. 26, 2009.

(Continued)

*Primary Examiner* — George Wyszomierski
*Assistant Examiner* — Tima M McGuthry-Banks
(74) *Attorney, Agent, or Firm* — Sheridan Ross P.C.

(57) ABSTRACT

A method for suppressing mercury dissolution during pressure oxidation of precious metal-containing materials in the presence of halogens and halides is provided. Pressure oxidation is performed under controlled oxidative conditions to maintain the mercury predominantly in the solid residue.

22 Claims, 9 Drawing Sheets

OTHER PUBLICATIONS

Booz Allen & Hamilton, Inc., "Draft: Mercury Mass Balance and Emissions Factor Estimates for Gold Ore Processing Facilities", U.S. Environmental Protection Agency, Region 9, Jan. 14, 2001, available at http://64.233.167.104/search?q=cache:IjcevdWVfxcJ:www.chem.unep.ch/Mercury/Sector-Specific-Information/Docs/Mercury_..., pp. 1-41, printed on Jan. 29, 2008.

Booz Allen & Hamilton, Inc., "Draft: Process Descriptions and Material Flows for Gold Ore Processing Facilities", U.S. Environmental Protection Agency, Region 9, prepared Jan. 22, 2001, available at pp. 1-27, printed Aug. 10, 2007.

Cadzow, et al., "Macraes Gold Project: Value creation through applied technology—Pressure oxidation", 2000 New Zealand Minerals & Mining Conference Proceedings, Oct. 29-31, 2000, pp. 1-7.

Dreisinger, et al., "The Application of the Platsol™ Process to Copper-Nickel-Cobalt-PGE/PGM Concentrates from Polymet Mining's Northmet Deposit", 2005, available at http://64.233.167.104/search?q=cache:foz8DXHq2ToJ:www.polymetmining.com/i/pdf/PolymetALTAPaper2005Final.pdf+Plat..., pp. 1-29, printed Aug. 13, 2007.

Ferron, et al., "Platsol Treatment of the Northmet Copper-Nickel-PGM Bulk Concentrate—Pilot Plant Results", 2001-2005, available at http://64.233.167.104/search?q=cache:Yctt6v4hlZwJ:www.polymetmining.com/i/pdf/Paper2001-05.pdf+Platsol&hl=en&ct=cln..., pp. 1-63, printed on Aug. 13, 2007.

Jones, et al., "Mercury and Modern Gold Mining in Nevada", Final Report to U.S. Environmental Protection Agency, Region IX, Department of Natural Resources and Environmental Sciences, Oct. 24, 2005, available at http://64.233.167.104/search?q=cache:XG77FK__6eO0J:www.chem.unep.ch/Mercury/Trade%2520information/NRDC-NEVAD..., pp. 1-73, printed on Jan. 29, 2008.

Jones, "CESL Copper Process", Randol Copper Hydromet Roundtable, Nov. 1996, available at http://64.233.167.104/search?q=cache:IwXXet41N_sJ:www.cesl.com/downloads/randol_96.pdf+pressure+oxidation+and+merc..., pp. 1-42, printed Aug. 10, 2007.

Simmons, et al., "Pressure oxidation problems and solutions: Treating carbonaceous gold ores containing trace amounts of chlorine (halogens", Mining Engineering, Jan. 1998, pp. 69-73.

Ketcham, et al., "The Lihir Gold Project; Process Plant Design", Minerals Engineering, 1993, vol. 6, Nos. 8-10, pp. 1037-1065.

* cited by examiner

PROCESS FOR MERCURY CONTROL DURING PRESSURE OXIDATION

CROSS REFERENCE TO RELATED APPLICATION

The present application claims the benefits of U.S. Provisional Application Ser. No. 60/973,365, filed Sep. 18, 2007, of the same title, which is incorporated herein by this reference in its entirety.

FIELD OF THE INVENTION

The invention relates generally to a method for pressure oxidation of a precious metal-bearing sulfide material and particularly to pressure oxidation of a gold-bearing refractory sulfide material containing mercury in the presence of a halogen-containing material.

BACKGROUND OF THE INVENTION

Gold ores are treated by a variety of processes. All hydrometallurgical gold recovery processes rely on leaching relatively low concentrations of gold from ores using lixiviants, primarily cyanide solutions. Ores that contain gold extracted by comminuting and followed by leaching with cyanide solution are known as "oxide" or "free milling" ores. However, gold recovery from most ores by cyanide leaching is not effective, with as little as 30 percent, or even lower, of the gold content of the ore being amenable to cyanide leaching. These ores are commonly termed "refractory" ores. Poor gold recovery from refractory ores is typically caused by the gold being occluded in sulfide mineral grains (usually arsenopyrite and/or pyrite grains) so that the gold cannot react with the cyanide leach solution or by dissolved gold being adsorbed by carbonaceous material present in the ore (this phenomenon is known as "preg robbing") Ores having both types of metallurgical problems (occluded and preg robbing) are commonly known as "double refractory" ores. Further losses in gold recovery can occur when dissolved gold is occluded by inorganic precipitates which typically occur during autoclave treatment of refractory gold ores.

A common method of treating refractory gold ores is by pressure oxidation in autoclaves. Pressure oxidation oxidizes sulfide minerals, rendering the residue non-refractory. The gold is then dissolved by cyanidation and concentrated by adsorption onto activated carbon (either in adsorption columns or in carbon added to the leaching process (known as Carbon-In-Leach ("CIL") or Carbon-In-Pulp ("CIP") techniques) or onto a resin (known as the Resin-In-Pulp ("RIP") technique). The adsorbed gold is eluted from the adsorbed carbon by washing and stripping with ammonia, nitric acid, hydrochloric acid, caustic solution, and/or steam. The gold is then converted to a solid from the eluate by electrowinning (electroplating of gold onto cathodes), precipitation and filtration, or cementation.

The mining industry, particularly the gold mining industry, has been recognized as a source of mercury emissions to the atmosphere. Precious metal-containing ores, such as gold ores, commonly contain mercury. Mercury is often present in gold ores as a free mineral such as mercury sulfide (cinnabar or HgS), mercury-telluride minerals (eg. coloradoite), as minor constituent in sulfide minerals, as elemental mercury, an impurity in other sulfide minerals, and/or an amalgam with the elemental gold. A typical mercury concentration in such ores is from about 0.1 to about 200 ppm.

The strongly oxidizing conditions in the autoclave promote oxidation of sulfide sulfur to sulfate sulfur and dissolution of mercury species. For cinnabar, which contains most of the mercury in the ore, the reaction is:

$$HgS + 2O_2 \rightarrow Hg^{2+} + SO_4^{2-} \quad (1)$$

Because the conditions that promote the oxidation of gold bearing sulfides can also oxidize mercury associated with sulfides, it is possible to dissolve the majority of mercury in the autoclave slurry. The slurry, when discharged from the autoclave, is transferred to a flash chamber, where pressure is relieved, and a substantial amount of the liquid phase is converted to steam. The steam and off-gases can include a significant portion of the dissolved mercury, with the rest remaining in the aqueous and solid phases of the slurry.

The oxidized mercury can be difficult and expensive to remove from the steam and liquid phase of the slurry and, once recovered, to dispose of.

SUMMARY OF THE INVENTION

These and other needs are addressed by the various embodiments and configurations of the present invention. The present invention provides a process for conducting pressure oxidation under controlled oxidation conditions to suppress or inhibit mercury dissolution in the autoclave.

An embodiment of the invention relates to a method to minimize substantially dissolution of mercury within the pressure oxidation (continuous or batch autoclave) process (in the presence of a halogen-containing material), thereby minimizing substantially potential emission of mercury in the pressure oxidation off-gas. Mercury is commonly associated with sulfide-associated gold deposits, and can occur in many forms, for example as elemental mercury; as the mercury sulphide, cinnabar; as mercury telluride, coloradoite; or as a minor constituent (e.g. sub-microscopic) within another typically non-mercury sulphide mineral. Dissolved halogens can originate from many forms; either originating within the solution phase (for example, as part of the pressure oxidation unit feed solution, originating from the raw water supply, or from other parts of the process); or dissolving from the solid phase during the pressure oxidation process.

In one configuration, the method includes the steps of:

(a) providing a slurried feed comprising (i) in the solid phase, a refractory sulfide-containing material, the material comprising about 0.05 oz/tonne or more of a precious metal, about 0.75 wt. % or more sulfides, and speciated and/or elemental mercury and (ii) a halogen (which may be in the solid or liquid phase);

(b) oxidizing the sulfide-containing material at elevated temperature and oxygen over pressure to convert most of the sulfide sulfur to sulfate sulfur and form an oxidized precious metal-containing material while inhibiting dissolution of most of the mercury from the sulfide-containing material; and (c) thereafter recovering most of the precious metal from the oxidized precious metal-containing material.

While not wishing to be bound by any theory, it is believed that halogens promote dissolution of the mercury and form dissolved halide complexes with the mercury. It has further been discovered that this reaction is preferred only under more oxidative conditions, or within a region on the Eh/pH diagram describing mercury/oxygen behavior. Above this region (which is usually around +500 mV at acidic pH levels), mercury halide formation is preferred and, below it, mercury halide formation is not preferred.

Prevention of mercury dissolution during pressure oxidation can be performed by monitoring the extent of oxidation and maintaining:

(i) a dissolved ferrous iron concentration in a liquid phase of the slurried feed of about 0.5 g/L or more (though this value changing with the variability of the feed, the exact operating conditions and set-up of the autoclave (eg. sample point location, operating temperature and pressure) and/or;

(ii) about 10 mole % or more of the iron soluble in the liquid phase in the ferrous state (though this value changing with the variability of the feed, the exact operating conditions and set-up of the autoclave (eg. sample point location, operating temperature and pressure) and/or;

(iii) an oxidation/reduction potential (ORP) of no more than about 500 to 530 millivolts, relative to a standard silver chloride electrode (though this value changing with the variability of the feed, the exact operating conditions and set-up of the autoclave (eg. sample point location, operating temperature and pressure). ORP and Eh are used interchangeably herein.

The dissolution of mercury into the aqueous phase can also be controlled by adjusting operating conditions that control sulfide oxidation kinetics such that conditions (i) and/or, (ii) and/or (iii) occur such as;

(iv) residence time and/or
(v) autoclave temperature and/or
(vi) oxygen partial pressure Dissolution of mercury can also be controlled by:

(vii) contacting the halogen with a component that causes formation of a halogen-containing reaction product that preferably does not include the precious metal or mercury and is substantially insoluble in the liquid phase; and (viii) contacting the halogen with a component that causes formation of a halogen-containing reaction product that does not include the precious metal or mercury, is more stable under the conditions of the autoclave than a halogen complex comprising the mercury, and is substantially soluble in the liquid phase.

The present invention can provide a number of advantages depending on the particular configuration. For example, mercury can be maintained primarily as compounds in the solid fraction of the waste residue of precious metal extraction, thereby reducing the content in other waste or recycle streams. Having lower concentrations of mercury in waste gases and aqueous effluents can simplify waste gas and effluent treatment. Further benefits are realized from higher precious metal recoveries, particularly from refractory and double refractory preg-robbing ores and concentrates. It is known that controlling the oxidation/reduction potential of the feed slurry during pressure oxidation can reduce dissolution of gold, particularly in the presence of halogens. In the absence of controlling oxidation/reduction potential, gold more readily dissolves into the liquid phase as a halide and is then adsorbed by preg-robbing carbonaceous matter or entrained by precipitating phases in the residue, rendering the gold unrecoverable. Further, it is believed that these benefits can be obtained without the need to specifically control the free acid concentration within the autoclave. Control of free acid concentration is often accomplished by the addition of acid consuming species, such as carbonate to the autoclave feed. However, the reaction of carbonates with the acids produced by sulfide oxidation releases carbon dioxide which must be vented from the autoclave. This venting results in a concomitant loss of oxygen and decrease in oxygen utilization efficiency. These and other advantages will be apparent from the disclosure of the invention(s) contained herein.

As used herein, "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Acid consumer" refers to any material that reacts with sulphuric acid. Acid consumers include bases or any molecular or ionic substance that can combine with a proton (hydrogen ion) to form a new compound. Commonly, a base reacts with (neutralizes) acids to form salts and often water. Exemplary classes of acid consumers include carbonates, oxides and hydroxides of metals. Acid consumers are commonly compounded with sodium, potassium, magnesium, and calcium. Specific examples of acid consumers include carbonates, such as limestone, soda ash, trona, dolomite, ankerite, and calcite; alkaline earth metal oxides such as lime; other metal oxides such as zinc oxide and magnesium oxide; alkali metal hydroxides such as sodium hydroxide and potassium hydroxide; other metal hydroxides such as ferric hydroxide (e.g., limonite and goethite) and aluminum hydroxides such as laterite, gibbsite, and diaspore; ammonia; and various clays.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "carbonaceous material" refers to organic carbon-containing material. Examples of organic carbonaceous materials include humic acid, hydrocarbons, and naturally occurring activated carbon.

As used herein, "inorganic carbon" refers primarily to the metallic carbonates, such as calcium carbonate and sodium carbonate, and to binary compounds of carbon such as carbon oxides, carbides, carbon disulfides, etc., ternary compounds, such as metallic cyanides, metallic carbonyls, carbonyl sulfides, etc.

As used herein, "halide" refers to a halide ion or a binary compound of the halogens.

As used herein, "halogen" refers to an electronegative element of group VIIA of the Periodic Table of the Elements, specifically fluorine, chlorine, bromine, and iodine, listed in order of their activity, with fluorine being the most active.

As used herein, "precious metal" refers to gold and silver and the platinum group metals (i.e., ruthenium, rhodium, palladium, osmium, iridium, and platinum), with gold and silver being more preferred, and gold even more preferred.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
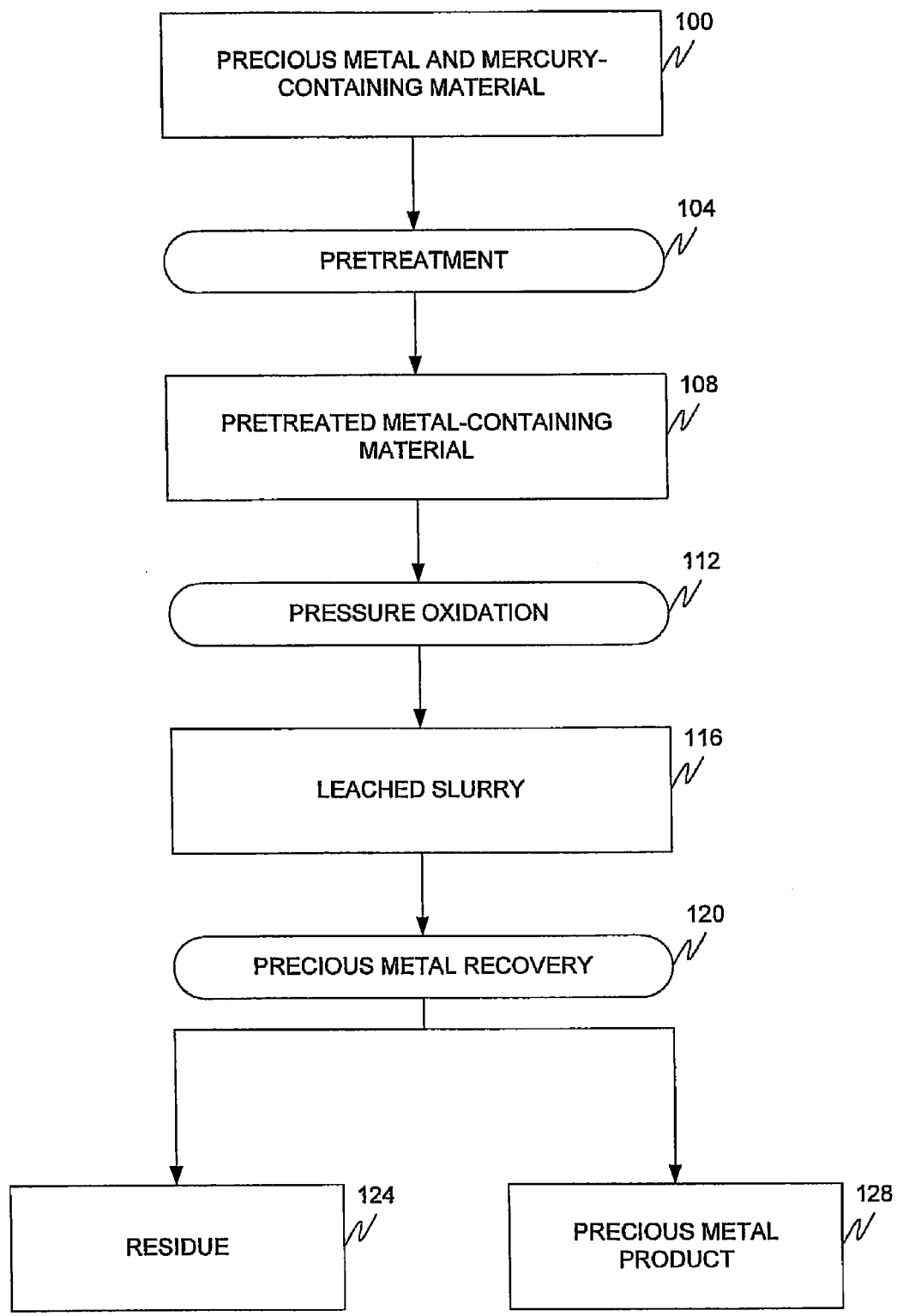
FIG. 1 is an embodiment of a process according to an embodiment of the present invention.

A first embodiment of the present invention will be discussed with reference to FIG. 1.

In a pretreatment step 104, a valuable and mercury-containing material 100 is pretreated. The feed material 100 can be in the form of an ore, concentrate, tailings, matte, slag, calcine, precipitate, or other material having precious metal-bearing mineral components. In the material 100, the precious metal is typically present as a sulfide, such as acanthite, argentite, and argentopyrite for silver and argentiferous gold sulfide and uytenbogaardtite for gold, or as a finely sized inclusion in the mineral grains of other sulfides (e.g., marcasite, pyrite, pyrrhotite, and arsenopyrite). The material 100 commonly includes at least about 6 wt. % and even more commonly from about 0.75 to about 40 wt. % sulfide sulfur, at least about 0.1 oz/tonne and even more commonly from about 0.05 to about 50 oz/tonne gold, at least about 1.0 oz/tonne and even more commonly from about 0.05 to about 500 oz/tonne silver, at least about 0.1 ppm, even more commonly from about 0.5 to about 200 ppm mercury, and even more commonly from about 2 to about 100 ppm (with the parts per million being based on the weight of the mercury relative to the weight of the material 100), and at least about 25 ppm and even more commonly from about 1 to about 250 ppm halogens (with the parts per million being based on the weight of the halogens relative to the weight of the material 100).

The material 100 can further include inorganic carbon and carbonaceous materials. Carbonaceous materials are frequently preg robbing. Typically, the material 100 includes from about 0.1 to about 30 wt. % inorganic carbon-containing materials (primarily as carbonates) and from about 0.3 to about 10 wt. % carbonaceous (potentially preg-robbing) materials. The material preferably has a $P_{80}$ size of no more than about 100 microns (200 mesh (Tyler)) and even more preferably of no more than about 75 microns.

In the pretreatment step 104, the material 100 is slurried with water and/or contacted with acid to prepare it for pressure oxidation. Pretreatment of carbonate containing feed materials with acid (either new acid or recycled acidic liquors from elsewhere in the process) reduces the generation of and the need to vent $CO_2$ during autoclave operation, thereby improving the oxygen efficiency of the pressure oxidation process. The preferred pH of the pretreated metal-containing material ranges from about pH 0.5 to about pH 2.0, and the pulp density from about 15% to about 55% solids.

The pretreated metal-containing material 108 is next subjected to pressure oxidation in step 112 to form a leached slurry 116. While not wishing to be bound by any theory, it is believed that mercury sulfides are rendered more soluble in the presence of halogens and halides. Halogen-containing materials are introduced into the pressure oxidation process through various inputted sources. As noted above, the metal-containing material itself can include naturally-occurring halogen-containing materials, including apatite, muscovite, halite, sylvite, carnallite, and fluorite. Another potential source of halogens is fresh or recycled process water introduced at one or more selected points in the hydrometallurgical process. Halogens are frequently dissolved in process water in the form of halide salts. The source of halogens in recycle process water can come from the build-up of material released from the mineral material or from various reagents, such as from hydrochloric acid used in stripping gold from a sorbent and from caustic used to neutralize the oxidized slurry or from cyanide used to leach gold following neutralization. In fresh process water, halogens can be naturally occurring and/or introduced through water pretreatment operations, such as water softening or sterilization. In a typical application, the liquid phase of the slurry during pressure oxidation will include at least about 1 ppm halogens, even more typically at least about 10 ppm halogens, and even more typically at least about 15 ppm halogens. Even at such low levels, increased mercury dissolution can occur.

When halogens are present during pressure oxidation, mercury reports to the residue in more oxidative regimes and does not report to the residue in less oxidative, or reductive, regimes. The oxidation potential of the liquid phase can be inferred by the relative amounts of ferric and ferrous iron, which is derived from oxidation of pyritic minerals. At higher oxidation potentials, ferrous iron is oxidized to ferric iron. It has been discovered during pressure oxidation that, when the dissolved ferrous iron concentration drops to a level below about 0.5 g/L, mercury species report to the solution phase. Stated another way, on a pH/Eh diagram of mercury reactivity with halogens there is a line above which mercury readily dissolves to form halides. Accordingly, pressure oxidation is preferably conducted to maintain a ferrous iron concentration of at least about 0.5 g/L, and even more preferably at least about 1.0 g/L. Stated another way, preferably at least about 10 mole %, more preferably at least about 20 mole %, and even more preferably at least about 50 mole % of the soluble iron in the liquid phase is in the ferrous state. Surprisingly, it has been discovered that maintaining the oxidation potential of the slurry below a selected level suppresses mercury dissolution, regardless of the halogen concentration. It should be noted that the exact level of the optimum target ferrous iron content will vary with set-up and operating conditions of the autoclave. For example, target optimum ferrous iron content may vary with the sample point location (e.g., if samples are able to be taken from the compartmental samples of the autoclave, as compared to only sampling at the discharge), and/or autoclave temperature, and/or feed variability to the autoclave (for autoclaves that are fed with highly varying feeds, the optimum ferrous iron content target will be higher (more conservative) than those autoclaves operating with very homogenous and consistent feeds).

With the above reactions in mind, there are numerous ways to suppress mercury dissolution. By way of illustration, reaction conditions can be varied to reduce the kinetics of mercury dissolution. Also, reaction conditions can be altered to shift the equilibrium in a direction that disfavors mercury halide formation. Alternatively, a component can be introduced during pressure oxidation to bind with the halogen in a form that substantially inhibits participation of the halogen in mercury dissolution. The reaction conditions and reagents selected for the autoclave depend, of course, on how mercury dissolution in the liquid phase of the slurry is to be suppressed or inhibited.

In one configuration, the susceptibility of the mercury to be dissolved during pressure oxidation is inhibited by operating the pressure oxidation such that the oxidation/reduction potential ("ORP") of the liquid phase is maintained below a threshold level (see FIG. 8). ORP, as used herein, is measured relative to a standard silver chloride electrode. Because of the severity of the operating conditions, it can be difficult to measure, in an operational autoclave compartment, the ORP of the liquid phase. The ORP of the liquid phase, however, can be inferred by measuring the ORP of the effluent liquid discharged from the autoclave. Stated another way, the operating conditions of the autoclave are varied (for example, by varying autoclave feed rate, temperature, oxygen addition rate or slurry level) in response to the comparative relationship between the ORP of the effluent liquid and the threshold ORP level. The ORP of the effluent liquid and, by implication, of the liquid phase in the autoclave can be reduced by, for example, reducing the input of molecular oxygen (reducing oxygen addition rate, the oxygen over pressure, or increasing solids feed rate) into pressure oxidation, reducing the operating temperature, or reducing the residence time (increasing the feed rate or reducing the slurry level in the autoclave). Preferably, the threshold ORP level is about 25 millivolts below the ORP that would be exhibited if the material 100 were pressure oxidized using any of the autoclave operating conditions of the various configurations discussed herein. Even more preferably, the threshold ORP level, relative to a standard silver chloride electrode, is no more than about 530 millivolts, even more preferably no more than about 520 millivolts, even more preferably no more than about 510 millivolts and even more preferably no more than about 500 millivolts, though the precise ORP will depend on the specific mineralogy of the material 100. It should be noted that the exact level of the optimum target solution ORP will change with the variability of the feed, and the set-up and operating conditions of the autoclave. For example, target optimum solution ORP may vary with the sample point location (e.g., if samples are able to be taken from the compartmental samples of the autoclave, as compared to only sampling at the discharge), and/or autoclave temperature, and/or feed variability to the autoclave (for autoclaves that are fed with highly varying feeds, the optimum solution ORP target will be higher (more conservative) than those autoclaves operating with very homogenous and consistent feeds).

Due to the difficulty in measuring ORP, a preferred implementation of this configuration is to control residence time. Preferably, the residence time in the autoclave of the slurry is no more than about 55 minutes, even more preferably no more than about 50 minutes, even more preferably no more than about 45 minutes. As autoclave temperature is decreased (typically below 220 to 225 degrees Celsius), this preferable residence time is able to be increased due to the progressively slower reaction kinetics occurring within the autoclave as autoclave temperature is decreased.

In yet another configuration, the propensity of mercury to dissolve during pressure oxidation is inhibited by controlling the partial pressure of molecular oxygen in, and the amount of molecular oxygen fed to, the autoclave. Reducing the concentration of dissolved molecular oxygen during pressure oxidation tends to reduce the concentration of dissolved mercury halide. Preferably, the molecular oxygen overpressure in the autoclave is no more than about 100 psia and even more preferably no more than about 50 psia. The operating parameters, such as residence time, feed slurry solids content, operating temperature, oxygen over pressure, are therefore controlled to optimize gold recovery and minimize mercury dissolution.

In yet another configuration, the propensity of mercury to dissolve during pressure oxidation is inhibited by reducing the liquid-phase concentration of dissolved halogens. This can be done, for example, by using fresh process water, which either has a low dissolved halogen concentration or is treated, such as by membrane filtration, Counter Current Decantation washing of the slurried material 100 upstream of pressure oxidation in the autoclave, and/or reagent addition, to have a low dissolved halogen concentration. Alternatively, this can be done by introducing a component directly into the liquid phase that is capable of reacting with and binding the dissolved halogens, thereby preventing them from reacting with the mercury. For example, a precipitant having a greater preference for the halogen than the mercury can be employed. Exemplary precipitants include lead and bismuth metals and compounds having those metals in a form that is capable of reacting to form the insoluble reaction product. In another example, the component may form, under the conditions in the autoclave, a stable, soluble complex with a halogen, thereby inhibiting the halogen from complexing with the mercury. Exemplary components include copper, lead, zinc, cobalt, bismuth, and tin and compounds having those metals in a form capable of disassociating to form the stable, soluble complex. Some components, such as lead and bismuth, either form a soluble or insoluble complex with the halogen, depending upon the specific attributes of the material 100 and specific pressure oxidation operating conditions.

Referring again to FIG. 1, the pressure oxidation step 112 is performed according to one or more of the above configurations to produce a leached slurry 116. In the leached slurry, at least most of the sulfur is present as sulfate sulfur while in the material 100 at least most of the sulfur is present as sulfide sulfur. At least most of the precious metals, particularly gold, remain in the oxidized residue. In step 120, the precious metal is recovered from the leached slurry 116 using known techniques to produce a gold barren waste residue 124 containing most of the mercury in the material 100 and a precious metal product 128.

By way of illustration, gold is commonly recovered by separating the gold-containing residue from the gold-lean liquid phase of the pressure oxidized slurry. This is commonly done in a counter current decantation circuit. The separated gold rich residue is neutralized using suitable acid consumers and subjected to cyanidation to dissolve the gold into a pregnant leach solution. The dissolved gold is then concentrated by adsorption onto activated carbon (either in adsorption columns, in carbon added to the leaching process (known as Carbon-In-Leach ("CIL") or Carbon-In-Pulp ("CIP") techniques), or in resin added to the leaching process (known as Resin-In-Leach ("RIL") technique). The adsorbed gold is eluted from the sorbent by stripping with ammonia, nitric acid, caustic, steam and/or other stripping solutions. The gold is then isolated and converted to a solid from the eluate by electrowinning (electroplating of gold onto cathodes), precipitation and filtration, or cementation.

Employing one or more of the above configurations can control effectively mercury concentrations in the liquid-phase of the slurry. Typically, no more than about 50% and even more typically no more than about 25% of the mercury in the material 100 is dissolved into the liquid phase. The balance (or most, if not practically all) of the mercury remains in the material 100.

EXPERIMENTAL

Example 1

Testing (Phase 1) was performed using a continuously fed 6 compartment autoclave, which was configured so that compartments 1 and 2 formed a single double sized compartment. The feed slurry was pre-treated with acid to a pH of approximately pH 1 and a percent solids of approximately 45% solids and was fed into the autoclave to achieve a residence time of approximately 70 to 140 minutes, and temperatures ranging from 200 to 225 degrees Celsius were tested. The oxygen over pressure was adjusted based upon pressure oxidation temperature. Samples were collected from the compartments and from the autoclave discharge. The Eh was measured relative to a standard silver chloride electrode. The mercury, sulfide, and gold in the collected solids was assayed. The mercury and total and ferrous iron in solution was measured. The results are summarized in both Table 1 and Table 2. All samples after compartment 3 show greater than 95% sulfide oxidation.

TABLE 1

Phase 1 Pilot Testing—Mercury Assays

| Sample Name | Pilot Run ID | Day # | Time | Temp (° C.) | Solids Hg (ug/kg) | Solution Hg (ug/L) |
|---|---|---|---|---|---|---|
| AC Feed | Run O-1 | 1 | 10:45 | 220 | 10200 | <50 |
| AC discharge | | | 10:45 | | 11617 | <50 |
| AC Feed | Run O-2 | 1 | 11:45 | 220 | 10246 | <50 |
| AC discharge | | | 11:45 | | 11871 | <50 |
| AC Feed | Run P-1 | 1 | 15:00 | 225 | 10347 | <50 |
| Compartment 6 | | | 15:00 | | | 3100 |
| AC discharge | | | 15:00 | | 3951 | 2730 |
| AC discharge | | | 16:15 | | | 330 |
| AC discharge | | | 17:15 | | | <50 |
| AC discharge | | | 18:00 | | | 2400 |
| AC Feed | Run P-2 | 1 | 18:45 | 225 | 10194 | <50 |
| Compartment 5 | | | 18:45 | | | 340 |
| Compartment 6 | | | 18:45 | | | 2620 |
| AC discharge | | | 18:45 | | 4482 | 2910 |
| AC Feed | Run Q-1 | 1 | 23:30 | 220 | 9629 | <50 |
| Compartment 5 | | | 23:30 | | | 1550 |
| Compartment 6 | | | 23:30 | | | 3080 |
| AC discharge | | | 23:30 | | 4308 | 3350 |
| AC discharge | | | 21:30 | | | <50 |
| AC discharge | | | 22:30 | | | 2330 |
| AC Feed | Run Q-2 | 2 | 0:30 | 220 | 9596 | <50 |
| Compartment 6 | | | 0:30 | | | 2570 |
| AC discharge | | | 0:30 | | 9096 | 1210 |
| AC Feed | Run R-1 | 2 | 8:50 | 210 | 10250 | <50 |
| Compartment 5 | | | 8:50 | | | <50 |
| Compartment 6 | | | 8:50 | | | 2250 |
| AC discharge | | | 8:50 | | 5207 | 1730 |
| AC discharge | | | 5:30 | | | 2730 |
| AC discharge | | | 6:30 | | | 2900 |
| AC discharge | | | 7:30 | | | 3300 |
| AC Feed | Run R-2 | 2 | 9:15 | 210 | 9446 | <50 |
| AC discharge | | | 9:15 | | 10408 | <50 |
| AC Feed | Run S-1 | 2 | 15:00 | 200 | 9704 | <50 |
| Compartment 5 | | | 15:00 | | | 470 |
| Compartment 6 | | | 15:00 | | | 2350 |
| AC discharge | | | 15:00 | | 9990 | |
| AC discharge | | | 13:40 | | | <50 |
| AC discharge | | | 14:30 | | | <50 |
| AC discharge | | | 16:30 | | | <50 |
| AC Feed | Run S-2 | 2 | 16:30 | 200 | 10004 | <50 |
| Compartment 5 | | | 16:30 | | | 340 |
| Compartment 6 | | | 16:30 | | | 1960 |
| AC discharge | | | 16:30 | | 8098 | 650 |

TABLE 2

Phase 1 Detailed Test Results

| Test ID & Conditions | AC Compartment | Total Residence Time (hrs) | Gold CIL Recovery (%) | | Eh (mV Ag/AgCl) | | Free Acid (g/L) | | Sulphide Sulphur (%) | | Total Iron (g/L) | | Ferrous Iron (g/L) | | Ratio of Ferrous to Total Iron (%) | |
|---|---|---|---|---|---|---|---|---|---|---|---|---|---|---|---|---|
| | | | 1st Sample | 2nd Sample | 1st Sample | 2nd Sample | 1st Sample | 2nd Sample | 1st Sample | 2nd Sample | 1st Sample | 2nd Sample | 1st Sample | 2nd Sample | 1st Sample | 2nd Sample |
| Run O | Feed | 0.00 | | | | | | | 8.29 | 8.45 | | | | | | |
| 220 | 1&2 | 0.60 | 79.6 | 76.7 | 434 | 416 | 34.9 | 26.3 | 3.50 | 5.02 | 11.20 | 10.10 | 8.06 | 8.50 | 72% | 84% |
| deg C. | 3 | 0.77 | 92.3 | 90.3 | 454 | 426 | 38.2 | 30.9 | 0.92 | 2.51 | 9.42 | 10.40 | 5.24 | 8.17 | 56% | 79% |

TABLE 2-continued

Phase 1 Detailed Test Results

| Test ID & Conditions | AC Compartment | Total Residence Time (hrs) | Gold CIL Recovery (%) | | Eh (mV Ag/AgCl) | | Free Acid (g/L) | | Sulphide Sulphur (%) | | Total Iron (g/L) | | Ferrous Iron (g/L) | | Ratio of Ferrous to Total Iron (%) | |
|---|---|---|---|---|---|---|---|---|---|---|---|---|---|---|---|---|
| | | | 1st Sample | 2nd Sample | 1st Sample | 2nd Sample | 1st Sample | 2nd Sample | 1st Sample | 2nd Sample | 1st Sample | 2nd Sample | 1st Sample | 2nd Sample | 1st Sample | 2nd Sample |
| 20 ppm Cl | 4 | 0.93 | 95.9 | 94.4 | 479 | 463 | 42.0 | 37.3 | 0.31 | 0.44 | 6.36 | 7.74 | 2.08 | 3.67 | 33% | 47% |
| | 5 | 1.08 | 96.1 | 94.6 | 491 | 491 | 42.5 | 38.8 | 0.32 | 0.45 | 5.70 | 7.08 | 1.36 | 2.50 | 24% | 35% |
| | 6 | 1.21 | 96.3 | 94.2 | 499 | 491 | 41.0 | 40.1 | 0.38 | 0.36 | 4.98 | 6.06 | 0.88 | 1.37 | 18% | 23% |
| | Discharge | 1.21 | 95.5 | 95.6 | 527 | 531 | 34.5 | 37.5 | 0.19 | 0.18 | 17.30 | 15.70 | 1.07 | 0.82 | 6% | 5% |
| Run P | Feed | 0.00 | | | | | | | 8.32 | 8.29 | | | | | | |
| 225 | 1&2 | 0.52 | 94.3 | 94.9 | 455 | 454 | 42.6 | 42.1 | 0.87 | 0.84 | 9.60 | 10.10 | 4.75 | 5.28 | 49% | 52% |
| deg C. | 3 | 0.70 | 96.9 | 95.3 | 441 | 433 | 39.3 | 38.4 | 0.62 | 0.61 | 10.60 | 11.20 | 6.80 | 8.02 | 64% | 72% |
| 20 ppm Cl | 4 | 0.86 | 96.8 | 96.9 | 487 | 485 | 41.5 | 43.8 | 0.19 | 0.26 | 5.58 | 6.00 | 1.33 | 1.46 | 24% | 24% |
| | 5 | 1.03 | 96.3 | 94.2 | 499 | 496 | 41.8 | 43.6 | 0.32 | 0.23 | 4.98 | 5.31 | 0.84 | 0.95 | 17% | 18% |
| | 6 | 1.17 | 94.9 | 96.7 | 508 | 509 | 39.7 | 40.3 | 0.36 | 0.25 | 4.26 | 4.47 | 0.53 | 0.54 | 12% | 12% |
| | Discharge | 1.17 | 94.1 | 94.4 | 552 | 554 | 32.6 | 38.0 | 0.22 | 0.23 | 13.80 | 13.20 | 0.33 | 0.28 | 2% | 2% |
| Run Q | Feed | 0.00 | | | | | | | 7.78 | 7.72 | | | | | | |
| 220 | 1&2 | 0.49 | 94.0 | 93.6 | 447 | 443 | 40.4 | 40.5 | 1.23 | 1.10 | 10.70 | 11.70 | 6.24 | 6.78 | 58% | 58% |
| deg C. | 3 | 0.68 | 94.2 | 95.0 | 432 | 436 | 41.4 | 39.2 | 0.78 | 0.77 | 11.60 | 11.80 | 7.88 | 7.86 | 68% | 67% |
| 100 ppm | 4 | 0.87 | 96.4 | 96.1 | 481 | 482 | 44.2 | 42.7 | 0.27 | 0.29 | 7.74 | 7.26 | 2.08 | 1.77 | 27% | 24% |
| Cl | 5 | 1.05 | 95.4 | 95.1 | 505 | 498 | 44.2 | 42.8 | 0.18 | 0.24 | 5.76 | 6.12 | 0.78 | 0.95 | 14% | 16% |
| | 6 | 1.20 | 79.8 | 76.4 | 519 | 517 | 42.3 | 41.3 | 0.25 | 0.11 | 5.04 | 4.89 | 0.43 | 0.40 | 9% | 8% |
| | Discharge | 1.20 | 84.8 | 88.7 | 550 | 531 | 39.0 | 37.0 | 0.14 | 0.17 | 15.10 | 15.70 | 0.38 | 0.66 | 3% | 4% |
| Run R | Feed | 0.00 | | | | | | | 7.82 | 7.95 | | | | | | |
| 210 | 1&2 | 0.67 | 93.5 | 93.2 | 436 | 460 | 38.8 | 37.6 | 1.28 | 1.10 | 10.90 | 12.10 | 7.09 | 5.66 | 65% | 47% |
| deg C. | 3 | 0.92 | 94.0 | 93.8 | 442 | 450 | 38.1 | 37.7 | 0.85 | 0.97 | 10.50 | 13.20 | 6.67 | 7.35 | 64% | 56% |
| 100 ppm | 4 | 1.14 | 91.5 | 96.4 | 495 | 482 | 41.4 | 39.5 | 0.22 | 0.27 | 7.62 | 10.40 | 1.45 | 2.88 | 19% | 28% |
| Cl | 5 | 1.35 | 88.5 | 96.2 | 504 | 490 | 42.1 | 38.9 | 0.15 | 0.20 | 7.14 | 9.54 | 0.98 | 2.17 | 14% | 23% |
| | 6 | 1.53 | 73.1 | 95.6 | 518 | 503 | 38.4 | 36.0 | 0.16 | 0.21 | 5.82 | 7.98 | 0.54 | 1.23 | 9% | 15% |
| | Discharge | 1.53 | 73.6 | 87.8 | 551 | 522 | | 37.2 | 0.15 | 0.22 | | 12.70 | | 0.76 | | 6% |
| Run S | Feed | 0.00 | | | | | | | 7.49 | 7.14 | | | | | | |
| 200 | 1&2 | 1.01 | 93.6 | 95.5 | 466 | 457 | 40.5 | 35.0 | 0.77 | 0.57 | 11.60 | 8.04 | 4.82 | 4.17 | 42% | 52% |
| deg C. | 3 | 1.40 | 93.3 | 96.0 | 467 | 461 | 39.8 | 35.2 | 0.49 | 0.40 | 10.40 | 7.74 | 4.43 | 3.85 | 43% | 50% |
| 100 ppm | 4 | 1.70 | 92.1 | 91.5 | 503 | 497 | 38.4 | 33.9 | 0.10 | 0.19 | 7.32 | 5.52 | 1.22 | 1.09 | 17% | 20% |
| Cl | 5 | 1.99 | 89.2 | 89.5 | 507 | 503 | 38.9 | 34.4 | 0.18 | 0.19 | 7.20 | 5.34 | 0.96 | 0.83 | 13% | 16% |
| | 6 | 2.23 | 68.4 | 74.2 | 517 | 509 | 35.5 | 33.4 | 0.17 | 0.18 | 6.42 | 4.98 | 0.67 | 0.67 | 10% | 13% |
| | discharge | 2.23 | 90.4 | 82.9 | 536 | 541 | 35.8 | | 0.14 | 0.14 | 10.10 | | 0.48 | | 5% | |

In Table 1, the "sample name" indicates the stream sampled (e.g., AC Feed refers to pilot autoclave feed, AC discharge to autoclave discharge, Compartment 5 to $5^{th}$ compartment in pilot autoclave, and Compartment 6 to $6^{th}$ compartment in pilot autoclave), "run" to the run identifier, "date" to the date of the run, "time" to the sampling time, "Temp" to the autoclave operating temperature, "solids Hg" to the mercury content of the residue, and "solution Hg" to the mercury content of the liquid phase of the autoclave discharge.

Figure 2:
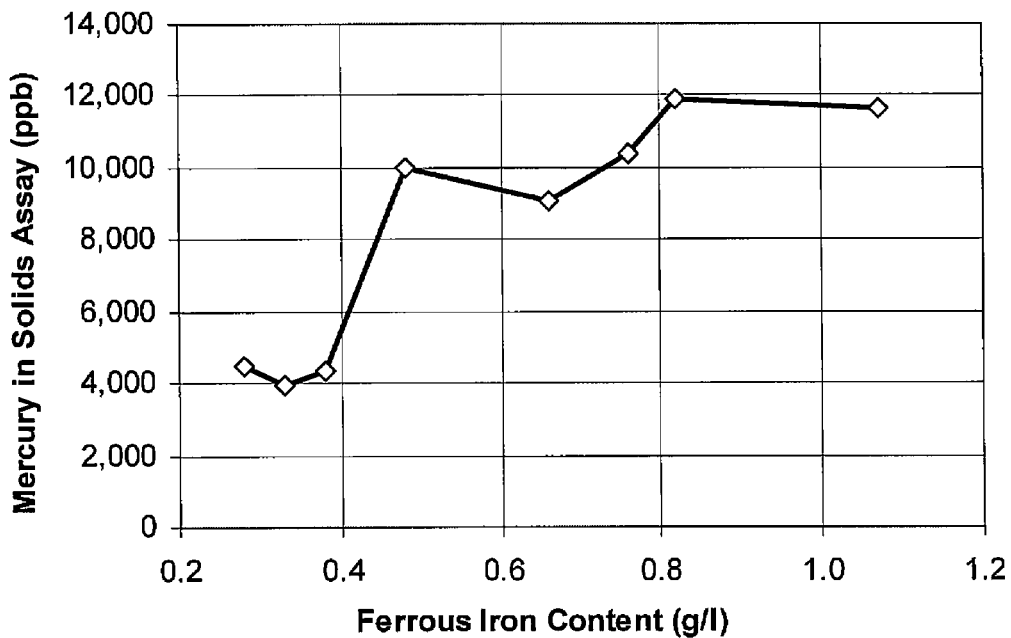
FIG. 2 is a plot of mercury in solids assay (ppb) (vertical axis) against ferrous iron content (grams/L) (horizontal axis) during Phase 1 Pilot testing.

FIG. 2 is a plot of the available autoclave discharge samples, comparing the ferrous iron content and the mercury solids content. A general trend is evident, showing that, as ferrous iron content decreases (i.e., autoclave oxidation extent is increased), the potential to solubilize mercury into liquor from within the autoclave discharge also increases. With mercury in solution form, it is believed that there is a potentially a higher risk of volatilizing mercury into the gaseous phase.

Example 2

Testing (Phase 2) was performed using a continuously fed 6 compartment autoclave, which was configured so that compartments 1 and 2 formed a single double sized compartment. The feed slurry was pre-treated with acid to a terminal pH of approximately 1 and a percent solids of approximately 45% solids was fed into the autoclave to achieve a residence time of approximately 45 to 55 minutes, and temperatures ranging from 220 to 225 degrees Celsius were tested. The oxygen over pressure was adjusted based upon pressure oxidation temperature. Samples were collected from the compartments and from the autoclave discharge. The Eh (mV) was measured relative to a standard silver chloride electrode. The mercury, sulfide, and gold were measured in the solids. The mercury, total, and ferrous iron was measured in the solution. The results are summarized in both Table 3 and Table 4. All samples after compartment 3 show greater than approximately 98% sulfide oxidation.

During Phase 2 of the testing, feed, autoclave profile, and discharge samples were analyzed for mercury content in both solids and solution form, to identify conditions existent for mercury dissolution. As can be seen from Table 3, some of the test runs showed depleted mercury content in the solids towards the end of the autoclave, and dissolved mercury towards the end of the autoclave.

TABLE 3

Phase 2 Pilot Autoclave—Mercury Assays

| Run | Cond. | Sample/ Compartment | 1st sample Solids (ppb) | 1st sample Soln (ug/L) | 2nd sample Solids (ppb) | 2nd sample Soln (ug/L) | 3rd sample Solids (ppb) | 3rd sample Soln (ug/L) | 4th sample Solids (ppb) | 4th sample Soln (ug/L) |
|---|---|---|---|---|---|---|---|---|---|---|
| W | 220° C., 15 ppm Cl | Feed | 8,157 | | 8,721 | | 8,086 | | 8,464 | |
| | | C1/2 | 8,673 | <50 | 9,132 | <50 | 8,586 | <50 | 8,967 | <50 |
| | | C3 | 8,486 | <50 | 9,154 | <50 | 8,515 | <50 | 9,166 | <50 |
| | | C4 | 8,242 | <50 | 9,121 | <50 | 8,603 | <50 | 9,110 | <50 |
| | | C5 | 8,573 | <50 | 9,104 | <50 | 8,180 | <50 | 9,092 | <50 |
| | | C6 | 8,150 | <50 | 4,942 | <50 | 7,951 | <50 | 7,215 | 1830 |
| | | Disch | 8,745 | | 5,385 | | 5,136 | | 4,498 | |
| X | 225° C., 15 ppm Cl | Feed | 8,838 | | 9,016 | | 8,280 | | 9,043 | |
| | | C1/2 | 9,496 | <50 | 9,401 | <50 | 9,312 | <50 | 9,411 | <50 |
| | | C3 | 9,026 | <50 | 9,676 | <50 | 9,316 | <50 | 10,000 | <50 |
| | | C4 | 9,853 | <50 | 9,661 | <50 | 9,501 | <50 | 9,681 | <50 |
| | | C5 | 9,605 | <50 | 9,110 | <50 | 9,502 | <50 | 9,222 | <50 |
| | | C6 | 9,002 | <50 | 8,716 | <50 | 2,935 | 2400 | 4,084 | 2990 |
| | | Disch | 8,849 | | 8,925 | | 5,275 | | 2,759 | |

TABLE 4

Phase 2 Detailed Test Results

| Test ID & Conditions | AC Compartment | Residence Times (hours) 1st sample | 2nd sample | 3rd sample | 4th sample | Solids CIL Gold Recovery (%) 1st sample | 2nd sample | 3rd sample | 4th sample | Eh (mV Ag/AgCl) 1st sample | 2nd sample |
|---|---|---|---|---|---|---|---|---|---|---|---|
| Run W 220 deg C. 15 ppm Cl | Feed | | | | | | | | | 308 | 301 |
| | 1&2 | 0.34 | 0.37 | 0.37 | 0.36 | 90.5% | 90.4% | 90.4% | 90.3% | 462 | 460 |
| | 3 | 0.47 | 0.51 | 0.51 | 0.50 | 95.1% | 95.3% | 95.4% | 95.5% | 478 | 478 |
| | 4 | 0.58 | 0.65 | 0.65 | 0.63 | 96.7% | 96.2% | 96.2% | 96.4% | 491 | 501 |
| | 5 | 0.69 | 0.78 | 0.78 | 0.77 | 97.0% | 96.2% | 96.2% | 96.2% | 513 | 514 |
| | 6 | 0.79 | 0.89 | 0.89 | 0.88 | 96.8% | 94.6% | 94.5% | 94.5% | 516 | 518 |
| | Discharge | 0.79 | 0.89 | 0.89 | 0.88 | 97.1% | 95.6% | 93.2% | 93.2% | 525 | 551 |
| Run X 225 deg C. 15 ppm Cl | Feed | | | | | | | | | 312 | 302 |
| | 1&2 | 0.31 | 0.35 | 0.36 | 0.38 | 88.2% | 89.3% | 90.6% | 86.9% | 457 | 457 |
| | 3 | 0.42 | 0.48 | 0.49 | 0.52 | 94.3% | 91.9% | 95.4% | 93.6% | 458 | 456 |
| | 4 | 0.53 | 0.61 | 0.61 | 0.66 | 95.3% | 94.7% | 96.4% | 96.1% | 482 | 483 |
| | 5 | 0.64 | 0.73 | 0.73 | 0.79 | 96.5% | 96.5% | 96.2% | 96.3% | 499 | 500 |
| | 6 | 0.73 | 0.83 | 0.84 | 0.90 | 96.8% | 96.4% | 91.7% | 92.6% | 512 | 511 |
| | Discharge | 0.73 | 0.83 | 0.84 | 0.90 | 96.8% | 96.1% | 93.7% | 92.8% | 550 | 545 |

| Test ID & Conditions | AC Compartment | Eh (mV Ag/AgCl) 3rd sample | 4th sample | Ferrous Iron (g/L) 1st sample | 2nd sample | 3rd sample | 4th sample | Sulphide Sulphur (%) 1st sample | 2nd sample | 3rd sample | 4th sample |
|---|---|---|---|---|---|---|---|---|---|---|---|
| Run W 220 deg C. 15 ppm Cl | Feed | 311 | 312 | 4.12 | 3.97 | 3.88 | 3.98 | 6.56 | 6.98 | 6.81 | 6.76 |
| | 1&2 | 462 | 465 | 3.69 | 4.26 | 4.18 | 4.56 | 1.03 | 0.99 | 0.97 | 0.97 |
| | 3 | 478 | 483 | 2.48 | 2.35 | 2.22 | 2.06 | 0.17 | 0.16 | 0.21 | 0.17 |
| | 4 | 504 | 507 | 1.17 | 0.82 | 0.69 | 0.68 | 0.10 | 0.06 | 0.01 | 0.01 |
| | 5 | 515 | 523 | 0.56 | 0.41 | 0.41 | 0.39 | 0.01 | 0.01 | 0.01 | 0.01 |
| | 6 | 518 | 518 | 0.42 | 0.39 | 0.40 | 0.27 | 0.23 | 0.05 | 0.04 | 0.03 |
| | Discharge | 541 | 555 | 0.44 | 0.26 | 0.27 | 0.26 | 0.02 | 0.01 | 0.07 | 0.02 |
| Run X 225 deg C. 15 ppm Cl | Feed | 319 | 304 | 3.66 | 3.41 | 3.32 | 3.42 | 6.54 | 6.70 | 6.69 | 6.62 |
| | 1&2 | 460 | 446 | 5.41 | 5.35 | 4.25 | 6.49 | 1.26 | 1.23 | 0.85 | 1.24 |
| | 3 | 475 | 447 | 5.13 | 5.49 | 2.19 | 6.55 | 0.85 | 0.70 | 0.12 | 0.56 |
| | 4 | 505 | 499 | 2.08 | 1.88 | 0.68 | 0.95 | 0.12 | 0.08 | 0.04 | 0.01 |
| | 5 | 517 | 526 | 1.09 | 0.96 | 0.41 | 0.39 | 0.13 | 0.04 | 0.06 | 0.01 |
| | 6 | 516 | 520 | 0.55 | 0.55 | 0.40 | 0.27 | 0.01 | 0.01 | 0.01 | 0.02 |
| | Discharge | 551 | 558 | 0.27 | 0.41 | 0.26 | 0.28 | 0.10 | 0.02 | 0.03 | 0.01 |

Figure 3:
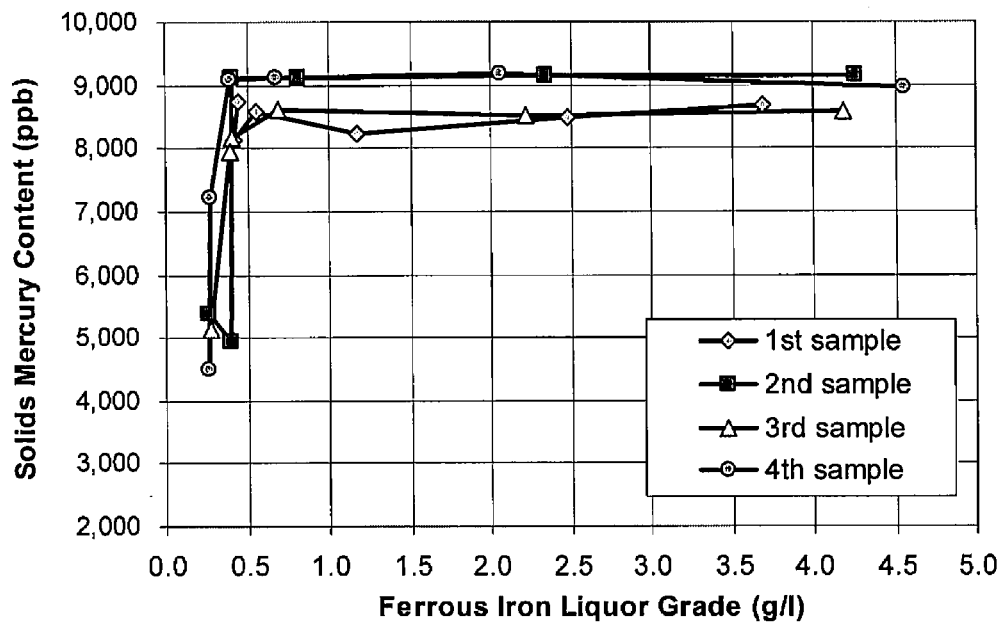
FIG. 3 is a plot of solids mercury content (ppb) (vertical axis) against ferrous iron liquor grade (grams/L) (horizontal axis) during Phase 2 Pilot AC testing at 220 degrees Celsius.
Figure 4:
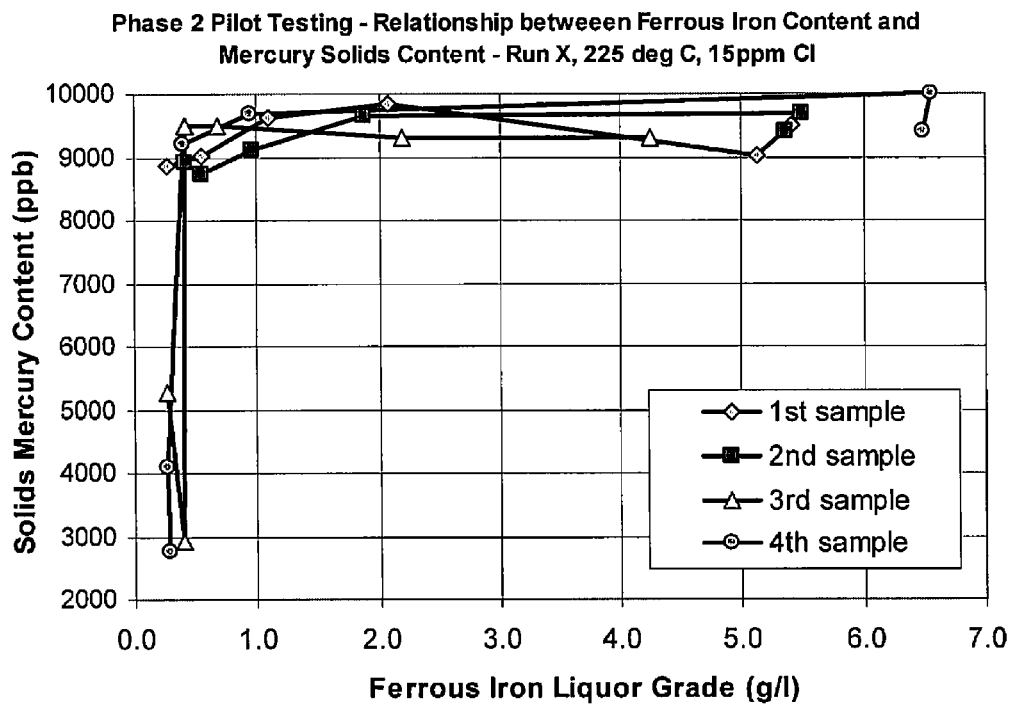
FIG. 4 is another plot of solids mercury content (ppb) (vertical axis) against ferrous iron liquor grade (grams/L) (horizontal axis) during Phase 2 Pilot AC testing at 225 degrees Celsius.

FIGS. 3 and 4 show the relationship of the ferrous iron content and the solids mercury content. It can be seen that the ferrous iron content of the autoclave products is a strong and reliable indicator of the occurrence of dissolution of the mercury from the autoclave solids.

Figure 5:
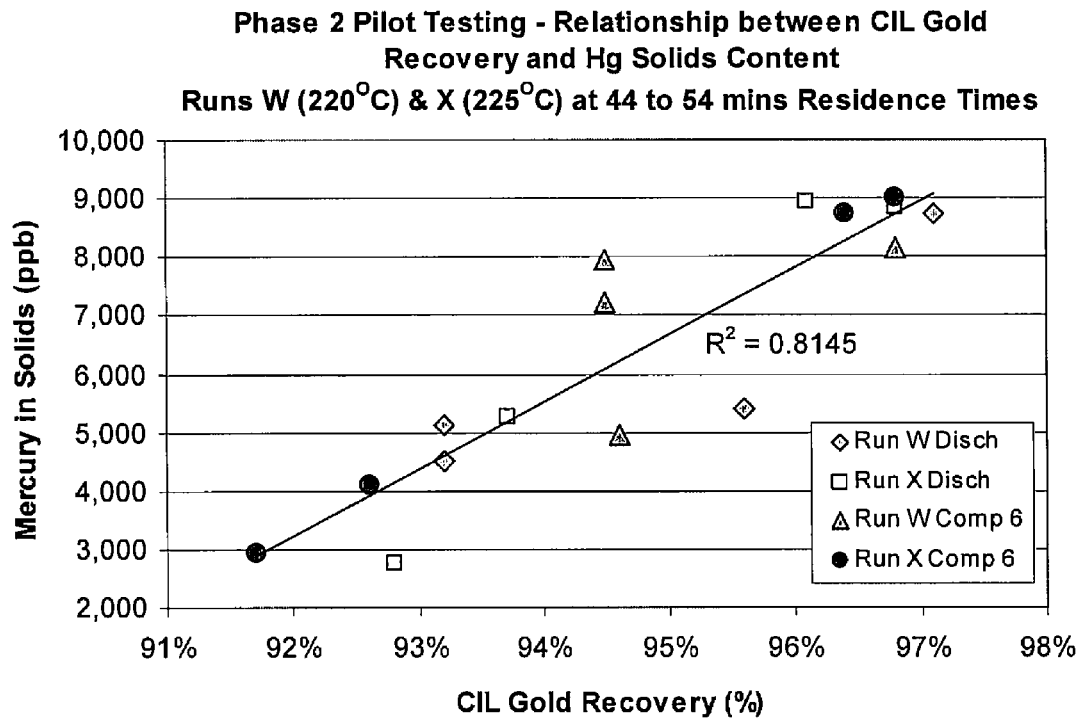
FIG. 5 is a plot of mercury in solids (ppb) (vertical axis) against CIL gold recovery (percent) (horizontal axis), of the Phase 2 Pilot AC testing at both 220 and 225 degrees Celsius autoclave temperatures with varying residence times.

There is a strong relationship between mercury dissolution and CIL gold recovery. FIG. 5 demonstrates this relationship, showing a plot of the CIL gold recovery and the solids mercury assay of the autoclave sample at both 220 and 225 degrees Celsius and with varying residence times. This plot shows that, when the autoclave is operated to maximize CIL gold recovery, it can simultaneously be operated to minimize mercury dissolution and, consequently, gaseous mercury emissions.

The test results (Phase 1, Table 2) demonstrate also, that the amount of effect that the excessive oxidation is having on the CIL gold recovery, increases with chloride content. That is, the decrease in CIL gold recovery drop under similar conditions as that occurs when mercury dissolution also occurs, increases significantly with higher chloride content in the autoclave feed. Therefore measures taken to remove the chloride from the feed of the autoclave will result in less reduced performance in terms of CIL gold recovery of the autoclave discharge, when the mercury dissolution occurs.

Figure 6:
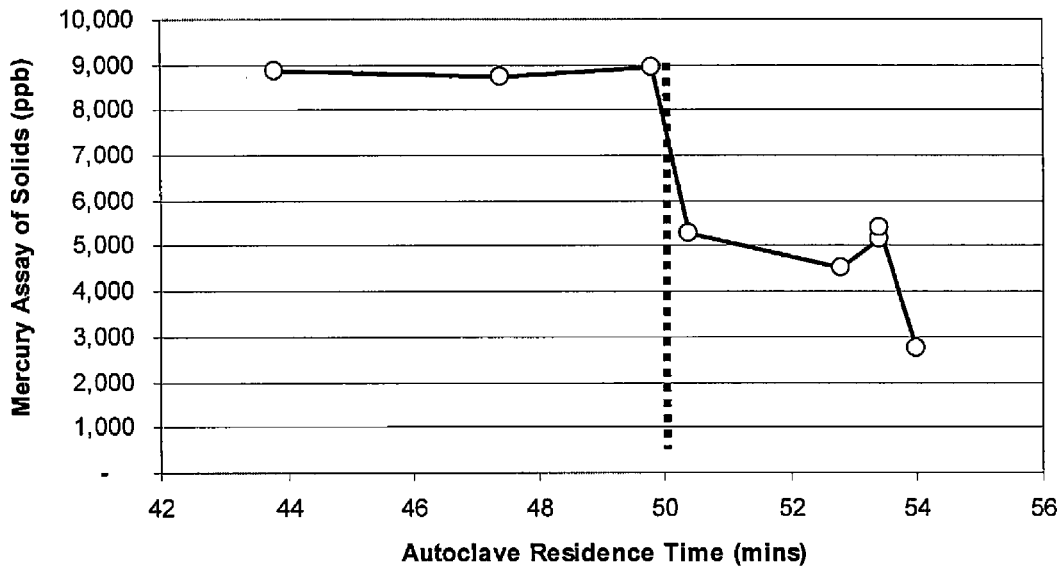
FIG. 6 is a plot of mercury in solids assay (ppb) (vertical axis) against Pilot Plant autoclave residence time (minutes) (horizontal axis) during Phase 2 testing.

FIG. 6 shows a plot of solids mercury content of the autoclave discharge and the residence time of the autoclave, indicating optimum residence times of ~45 to 50 minutes for the particular ore tested at the operating temperatures of 220 to 225 degrees Celsius.

Figure 7:
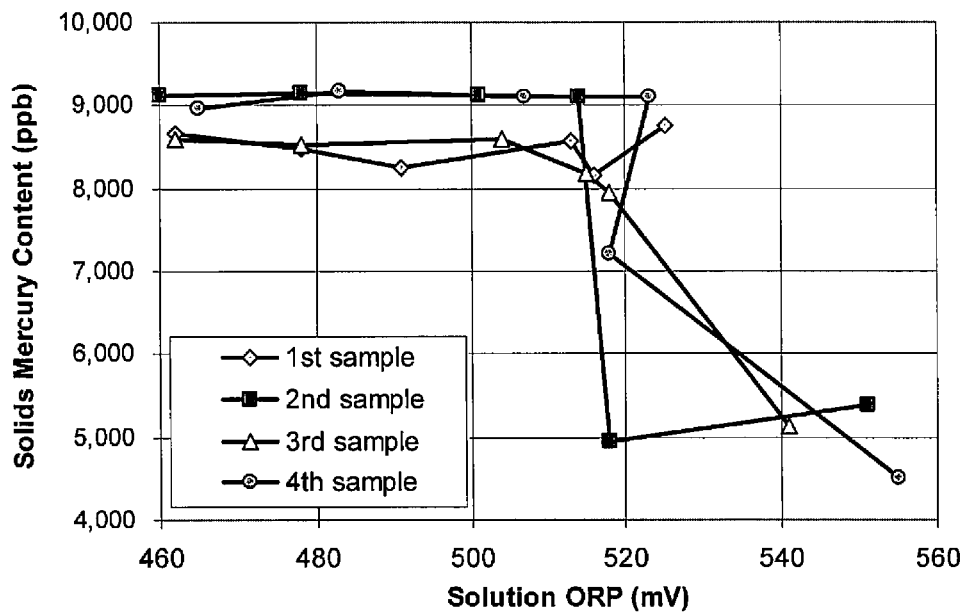
FIG. 7 is a plot of mercury in solids assay (ppb) (vertical axis) against ORP (mV) (horizontal axis) during Phase 2 testing at 220 degrees Celsius.
Figure 8:
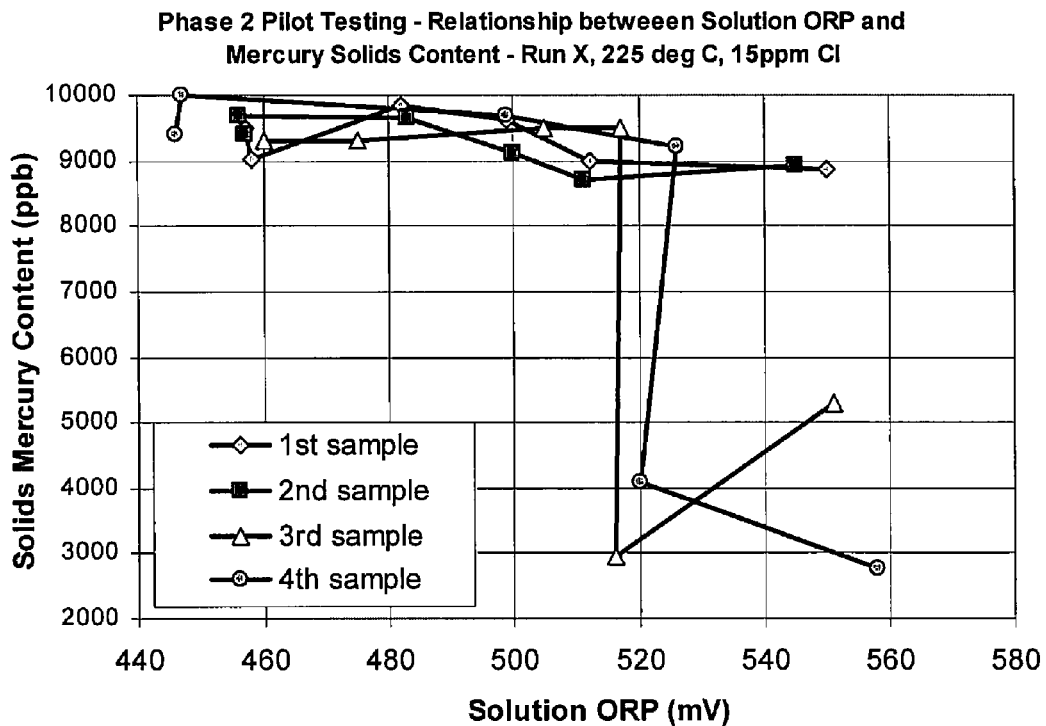
FIG. 8 is a plot of mercury in solids assay (ppb) (vertical axis) against ORP (mV) (horizontal axis) during Phase 2 testing at 225 degrees Celsius.
Figure 9:
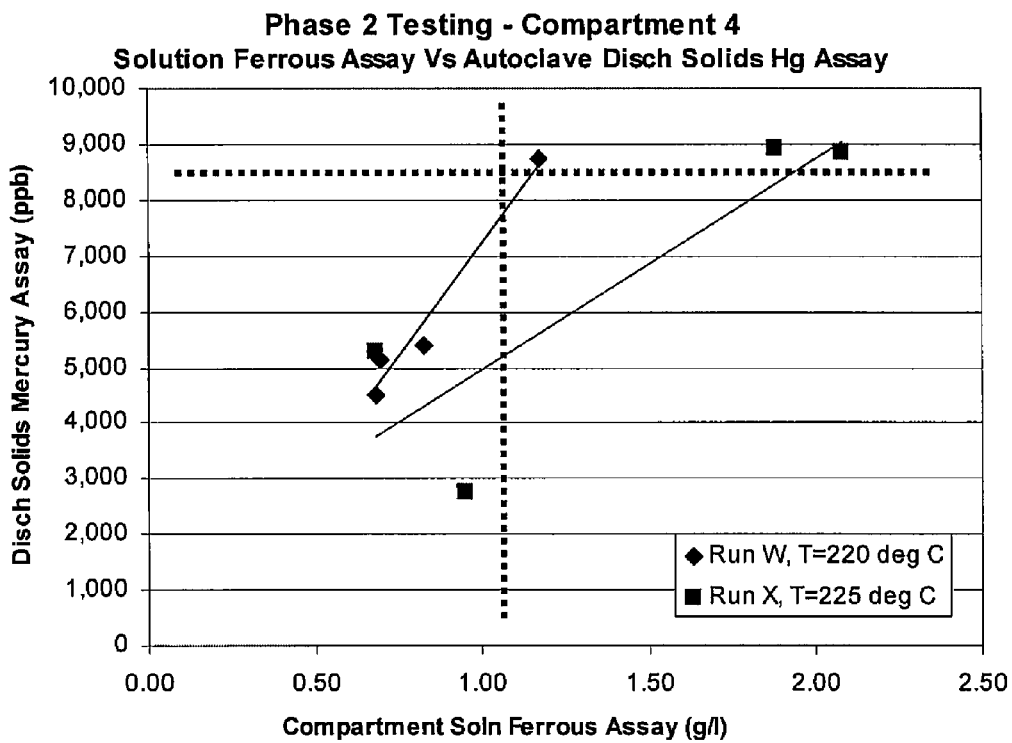
FIG. 9 is a plot (data points) of mercury in solids assay (ppb) in the discharge samples (vertical axis) against the Compartment 4 solution ferrous iron assay (g/l) (horizontal axis) during Phase 2 testing at both 220 and 225 degrees Celsius autoclave temperatures.
Figure 10:
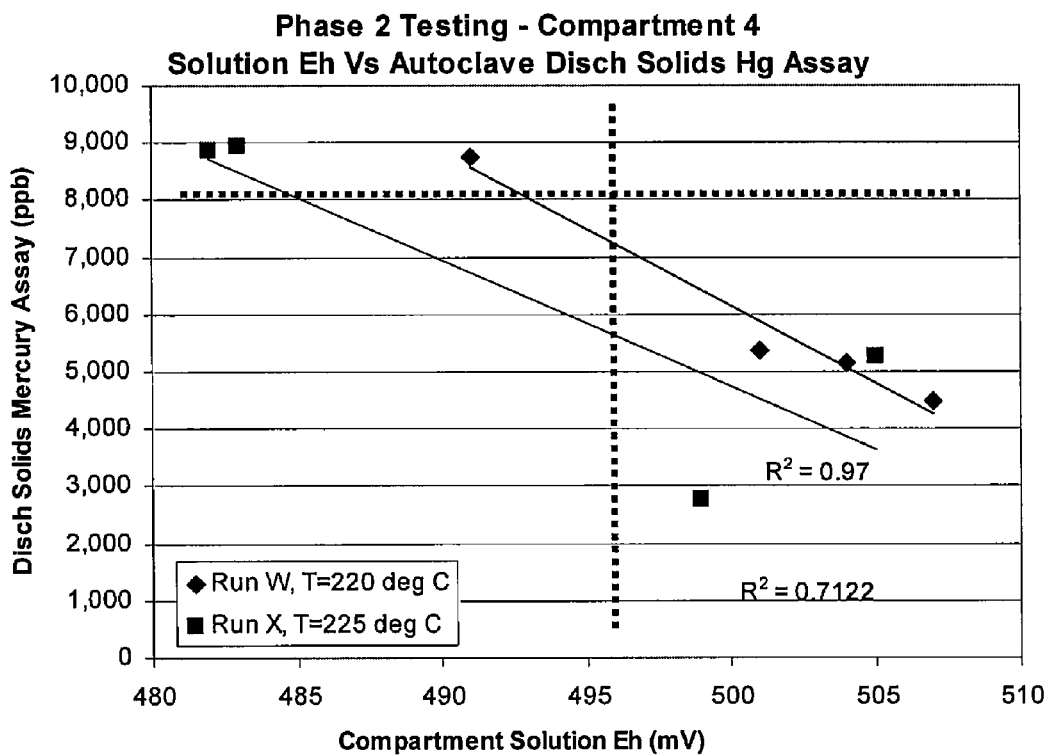
FIG. 10 is a plot (data points) of mercury in solids assay (ppb) in the discharge samples (vertical axis) against the Compartment 4 solution ORP (mV) (horizontal axis) during Phase 2 testing at both 220 and 225 degrees Celsius autoclave temperatures.
Figure 11:
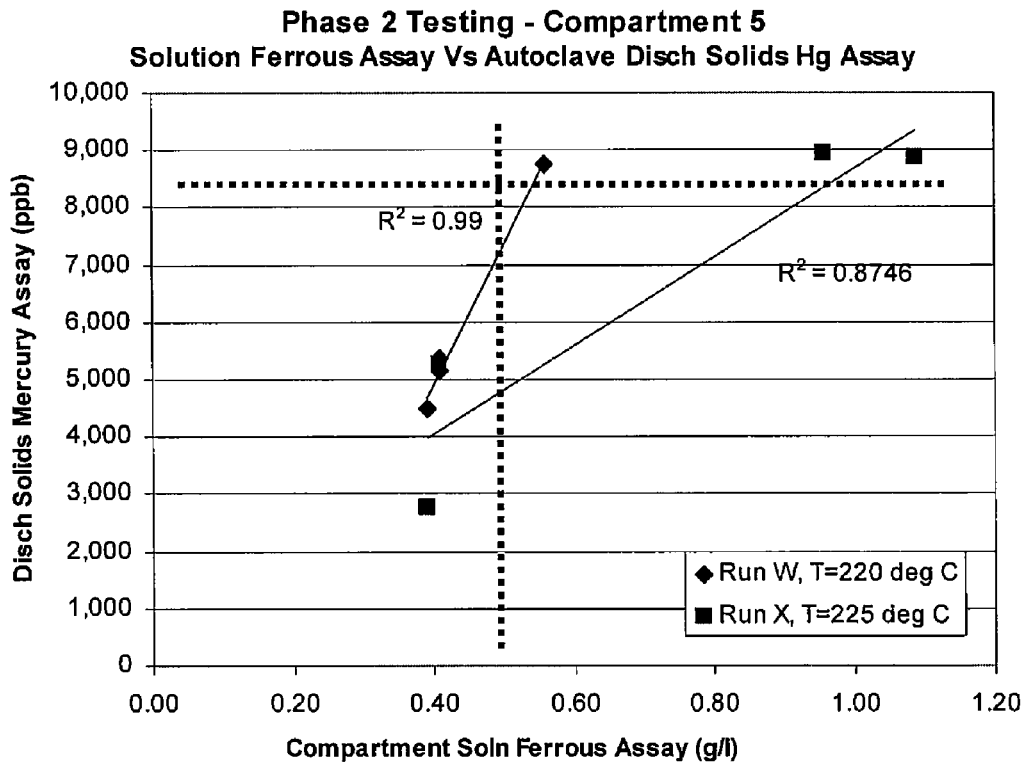
FIG. 11 is a plot (data points) of mercury in solids assay (ppb) in the discharge samples (vertical axis) against the Compartment 5 solution ferrous iron assay (g/l) (horizontal axis) during Phase 2 testing at both 220 and 225 degrees Celsius autoclave temperatures.
Figure 12:
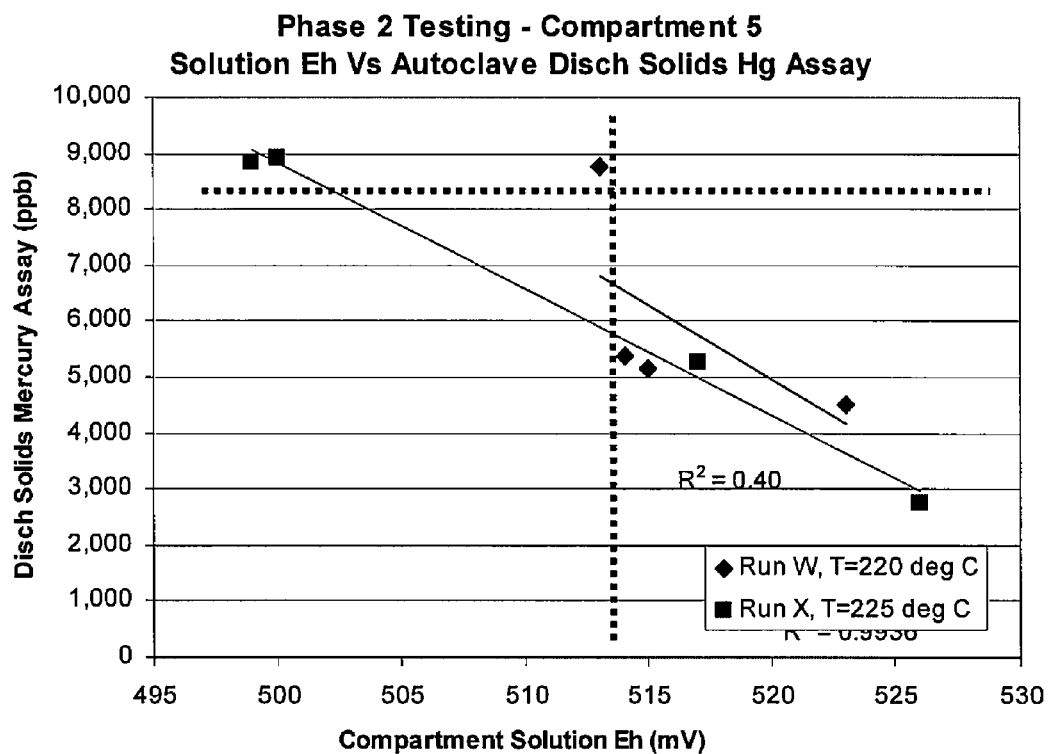
FIG. 12 is a plot (data points) of mercury in solids assay (ppb) in the discharge samples (vertical axis) against the Compartment 5 solution ORP (mV) (horizontal axis) during Phase 2 testing at both 220 and 225 degrees Celsius autoclave temperatures.
Figure 13:
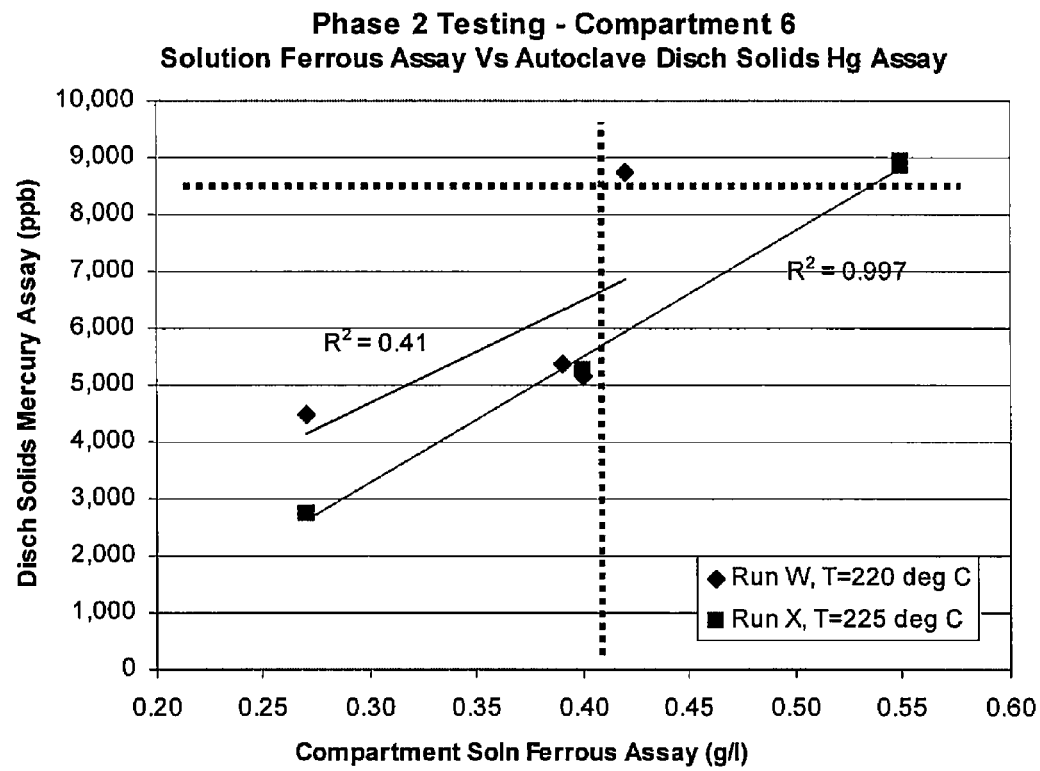
FIG. 13 is a plot (data points) of mercury in solids assay (ppb) in the discharge samples (vertical axis) against the Compartment 6 solution ferrous iron assay (g/l) (horizontal axis) during Phase 2 testing at both 220 and 225 degrees Celsius autoclave temperatures.
Figure 14:
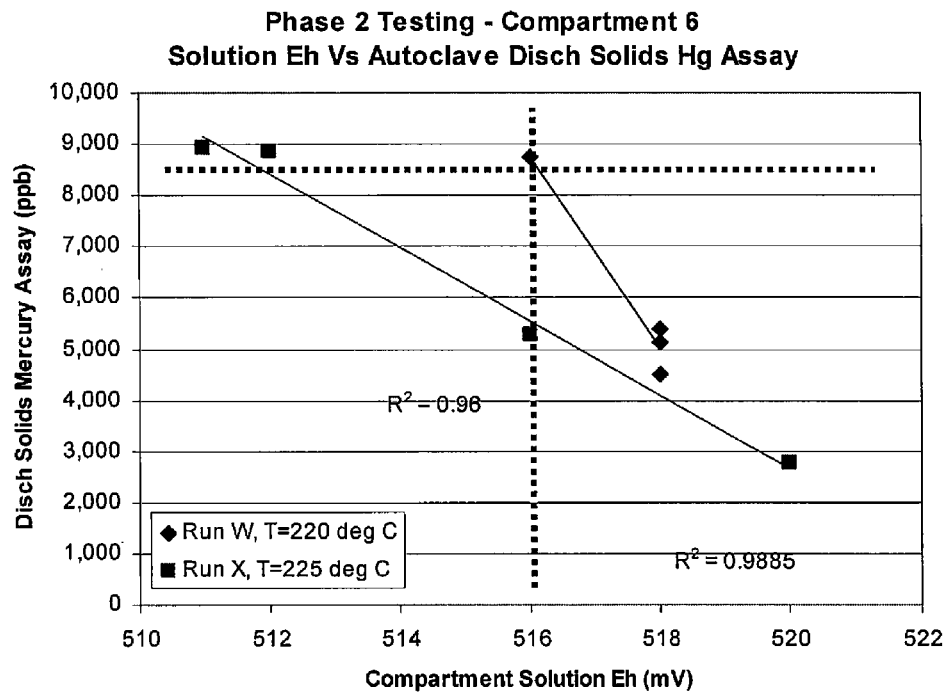
FIG. 14 is a plot (data points) of mercury in solids assay (ppb) in the discharge samples (vertical axis) against the Compartment 6 solution ORP (mV) (horizontal axis) during Phase 2 testing at both 220 and 225 degrees Celsius autoclave temperatures.

FIGS. 7 and 8 show plots of the autoclave discharge solution ORP (mV) (relative to a standard silver chloride electrode) versus the autoclave solids mercury content (ppb), indicating that the mercury can be kept in the residue when operating below an ORP of 510 mV, and that ORP is also a strong and reliable indicator of mercury dissolution.

FIGS. 9 to 14 show plots of the autoclave $4^{th}$, $5^{th}$ and $6^{th}$ compartmental sample solutions ORP (mV) (relative to a standard silver chloride electrode) and ferrous iron assay (g/l) versus the autoclave discharge solids mercury content (ppb). These sets of figures indicate it is possible to anticipate expected mercury dissolution in the autoclave discharge or near-end autoclave compartments, by analysing sub-sample solutions of the autoclave compartments for ferrous iron content and ORP.

Figure 15:
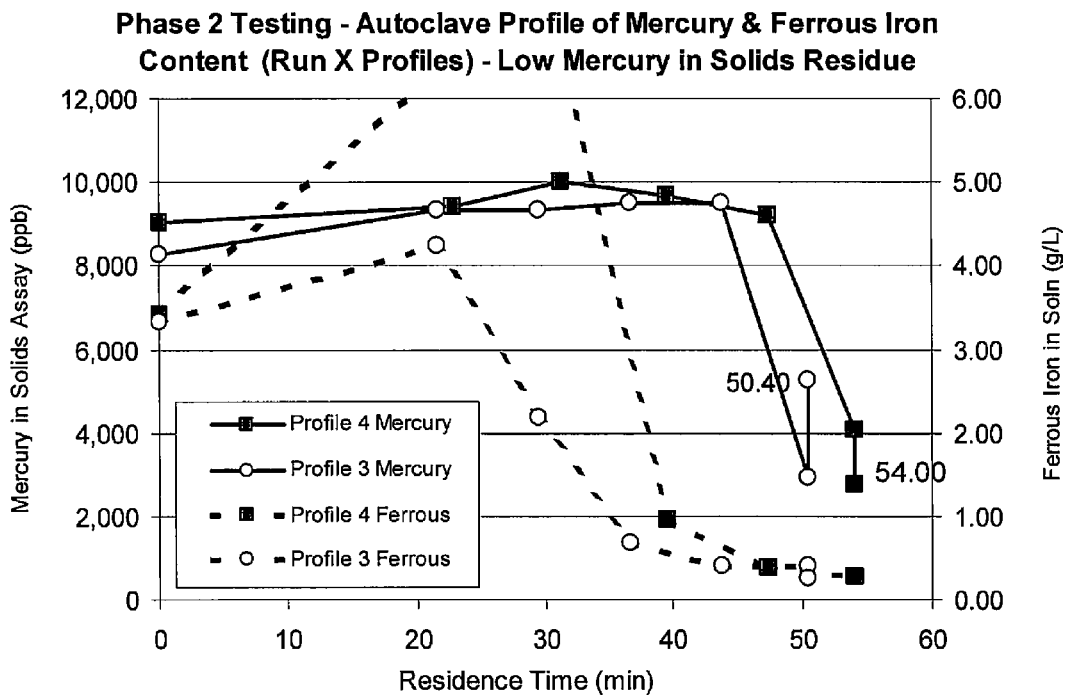
FIG. 15 are autoclave profiles plots of mercury in solids assay (ppb) ($1^{st}$ vertical axis) and solution ferrous iron assay (g/l) (2nd vertical axis), versus autoclave residence time (minutes) (horizontal axis) for Phase 2 testing, Run X, profiles 3 and 4 (high mercury dissolution)
Figure 16:
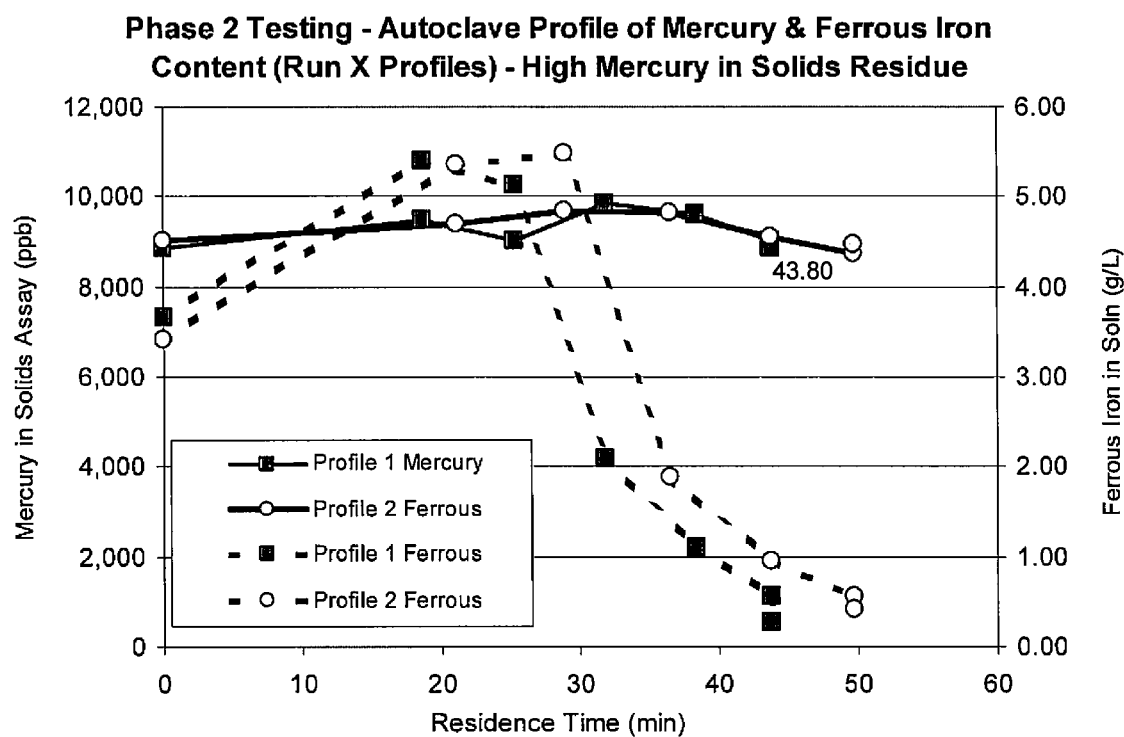
FIG. 16 are autoclave profiles plots of mercury in solids assay (ppb) ($1^{st}$ vertical axis) and solution ferrous iron assay (g/l) (2nd vertical axis), versus autoclave residence time (minutes) (horizontal axis) for Phase 2 testing, Run X, profiles 1 and 2 (indiscernible mercury dissolution).

FIGS. 15 and 16 shows profiles from Phase 2 testing, Run X, of mercury in solids assay (ppb) and solution ferrous iron assay (g/l) versus autoclave residence time (minutes), and includes samples from the autoclave compartments and discharge.

The autoclave profiles plotted in FIG. 15 show that significant mercury dissolution occurs when operating conditions, such as residence time, favour greater oxidation. The extent of oxidation is demonstrated by the fact that ferrous iron in the solution phase is less than 1 g/L at 40 minutes residence time. FIG. 16 shows data from samples tested under the same conditions as those shown in FIG. 15, with the exception of a lower total residence time. There is little change in the mercury content of the solids fraction, and correlate this with a lower extent of oxidation as indicated by the fact that ferrous iron in solution remains above 1 g/L at the 40 minute residence time.

A number of variations and modifications of the invention can be used. It would be possible to provide for some features of the invention without providing others. The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) slurrying a feed material to provide a slurried feed, the feed material comprising a refractory sulfide-containing material, the material comprising at least about 0.05 oz/tonne of a precious metal, at least about 0.75 wt % sulfides, and at least about 0.5 ppm mercury and the slurried feed comprising at least one halogen;
   (b) oxidizing the refractory sulfide-containing material at elevated temperature and super-atmospheric pressure to convert at least most of the sulfide sulfur to sulfate sulfur and form an oxidized precious metal-containing material, wherein, during step (b), dissolution of mercury from the sulfide-containing material is inhibited by performing at least one of the following:
      (B1) maintaining a dissolved ferrous iron concentration in a liquid phase of the slurried feed of at least about 0.5 g/L;
      (B2) maintaining at least about 10 mole % of soluble iron in the liquid phase in the ferrous state;
      (B3) maintaining an oxidation/reduction potential (ORP) of no more than about 530 millivolts, relative to a standard silver chloride electrode;
      (B4) contacting the halogen with a component that causes formation of a halogen-containing reaction product, the halogen-containing reaction product not comprising the precious metal or mercury and being substantially insoluble in the liquid phase; and
      (B5) contacting the halogen with a component that causes formation of a halogen-containing reaction product, the halogen-containing reaction product not comprising the precious metal or mercury, being more stable under the operating conditions of step (b) than a halogen complex comprising the mercury, and is substantially soluble in the liquid phase; and
   (c) thereafter recovering the precious metal from the oxidized precious metal-containing material to form a precious metal product, wherein no more than about 25% of the mercury in the feed material is dissolved in the liquid phase during step (b).

2. The method of claim 1, wherein a concentration of the halogen in the slurried feed is at least about 5 ppm, wherein the concentration of mercury in the sulfide-containing material ranges from about 2 to about 100 ppm, and wherein the sulfide-containing material, before step (b), comprises from about 0.75 to about 40 wt. % sulfide sulfur, and from about 0.05 to about 50 oz/tonne precious metals.

3. The method of claim 1, wherein substep (C1) is performed.

4. The method of claim 3, wherein the dissolved ferrous iron concentration is at least about 1.0 g/L.

5. The method of claim 1, wherein substep (C2) is performed.

6. The method of claim 5, wherein at least about 50 mole % of the soluble iron is in the liquid phase.

7. The method of claim 1, wherein substep (C3) is performed.

8. The method of claim 7, wherein the ORP is no more than about 510 millivolts.

9. The method of claim 1, further comprising:
adjusting autoclave operating conditions including a plurality of operating temperatures, feed rate, residence time, slurry level, oxygen addition rate, and molecular oxygen overpressure to maintain any of the items C1 to C3 above.

10. The method of claim 9, wherein, in step (b): the operating temperature is below about 225 degrees Celsius, the sulfide-containing material has a residence time in an autoclave of no more than about 55 minutes, and the molecular oxygen overpressure is no more than about 100 psia.

11. The method of claim 1, wherein substep (C4) is performed.

12. The method of claim 1, wherein substep (C5) is performed.

13. In a pressure oxidation process, comprising:
slurrying a feed material to provide a slurried feed, the feed material comprising a sulfide-containing material, the feed material comprising a precious metal, sulfide-containing sulfur, and at least about 0.5 ppm mercury and the slurried feed comprising at least about 0.5 ppm of one or more halogens;
oxidizing the sulfide-containing material, at elevated temperature and molecular oxygen over pressure, to convert at least most of the sulfide sulfur to sulfate sulfur and form an oxidized precious metal-containing material, wherein at least one of the following steps is performed during oxidation:
(a) maintaining a dissolved ferrous iron concentration in a liquid phase of the slurried feed of at least about 0.5 g/L;
(b) maintaining about 10 mole % or more of soluble iron in the liquid phase in the ferrous state; and
(c) maintaining an oxidation/reduction potential (ORP) of no more than about 510 millivolts, relative to a standard silver chloride electrode, wherein, by the at least one of steps (a), (b), and (c), at least most of the mercury is maintained in the oxidized precious metal-containing material.

14. The process of claim 13, wherein step (a) is performed.
15. The process of claim 13, wherein step (b) is performed.
16. The process of claim 13, wherein step (c) is performed.
17. The process of claim 13, wherein the residence time is no more than about 55 minutes, wherein the sulfide-containing material, before oxidation, comprises from about 0.75 to about 40 wt. % sulfide sulfur from about 50 to about 100 ppm mercury, and from about 0.05 to about 50 oz/tonne precious metals, wherein no more than about 25% of the mercury in the material is dissolved in the liquid phase after oxidation, and wherein the material comprises preg-robbing carbonaceous carbon.

18. A method, comprising:
(a) slurrying a feed material to provide a slurried feed, the feed material comprising a refractory sulfide-containing material, the material comprising at least about 0.1 oz/tonne of gold, at least about 0.75 wt. % sulfides, preg-robbing carbonaceous carbon, and at least about 0.5 ppm mercury and the slurried feed comprising at least one halogen; and
(b) oxidizing the sulfide-containing material, at elevated temperature and super-atmospheric pressure, to convert at least most of the sulfide sulfur to sulfate sulfur and form an oxidized precious metal-containing material, wherein, during oxidizing of the sulfide-containing material, a dissolved ferrous iron concentration in a liquid phase of the slurried feed is at least about 0.5 g/L, at least about 10 mole % of dissolved iron in the liquid phase is in the ferrous state, and the slurried feed has an oxidation/reduction potential (ORP) of no more than about 530 millivolts, relative to a standard silver chloride electrode, to maintain at least most of the mercury in a solid phase of the oxidized precious metal-containing material.

19. The method of claim 18, wherein a residence time of the slurried feed material in the oxidizing step is no more than about 55 minutes.

20. The method of claim 19, wherein the residence time is more than about 45 minutes, wherein a concentration of the halogen in the slurried feed is at least about 5 ppm, wherein the sulfide-containing material, before step (b), comprises from about 0.75 to about 40 wt. % sulfide sulfur, from about 2 to about 100 ppm mercury, and from about 0.05 to about 50 oz/tonne precious metals, and wherein no more than about 25% of the mercury in the material is dissolved in the liquid phase after the oxidizing step.

21. The method of claim 19, wherein a dissolved ferrous iron concentration in a liquid phase of the slurried feed in step (b) is maintained at least about 1.0 g/L and wherein at least about 20 mole % of the soluble iron in the liquid phase is in the ferrous state after step (b).

22. The method of claim 18, wherein an oxidation/reduction potential (ORP) of the slurried feed in step (b) is maintained at a level of no more than about 510 millivolts, relative to a standard silver chloride electrode.

* * * * *

UNITED STATES PATENT AND TRADEMARK OFFICE
CERTIFICATE OF CORRECTION

PATENT NO. : 7,918,919 B2  
APPLICATION NO. : 12/208961  
DATED : April 5, 2011  
INVENTOR(S) : Daniel Hillier, Noelene Ahern and Yeonuk Choi Page 1 of 1

It is certified that error appears in the above-identified patent and that said Letters Patent is hereby corrected as shown below:

In Claim 3, column 17, line 8, delete "substep (C1)" and replace with --substep (B1)--.

In Claim 5, column 17, line 12, delete "substep (C2)" and replace with --substep (B2)--.

In Claim 7, column 17, line 16, delete "substep (C3)" and replace with --substep (B3)--.

In Claim 9, column 17, lines 24-25, delete "items C1 to C3" and replace with --items B1 to B3--.

In Claim 11, column 17, line 31, delete "substep (C4)" and replace with --substep (B4)--.

In Claim 12, column 17, line 33, delete "substep (C5)" and replace with --substep (B5)--.

In Claim 17, column 18, line 7, delete "sulfur from about 50" and replace with --sulfur, from about 0.5--.

Signed and Sealed this  
Fourth Day of September, 2012

David J. Kappos  
*Director of the United States Patent and Trademark Office*

UNITED STATES PATENT AND TRADEMARK OFFICE
CERTIFICATE OF CORRECTION

PATENT NO. : 7,918,919 B2  Page 1 of 1
APPLICATION NO. : 12/208961
DATED : April 5, 2011
INVENTOR(S) : Daniel Hillier, Noelene Ahern and Yeonuk Choi It is certified that error appears in the above-identified patent and that said Letters Patent is hereby corrected as shown below:

In Claim 1, column 16, line 32, delete "the material comprising" and replace with --the feed material comprising--.

In Claim 17, column 18, line 10, delete "material is dissolved" and replace with --feed material is dissolved--.

In Claim 17, column 18, line 11, delete "the material comprises" and replace with --the feed material comprises--.

In Claim 18, column 18, line 16, delete "the material comprising" and replace with --the feed material comprising--.

Signed and Sealed this
Ninth Day of October, 2012

David J. Kappos
*Director of the United States Patent and Trademark Office*